D. F. OLIVER.
VEHICLE SPRING.
APPLICATION FILED MAR. 15, 1915.
1,173,850.
Patented Feb. 29, 1916.
2 SHEETS—SHEET 2.
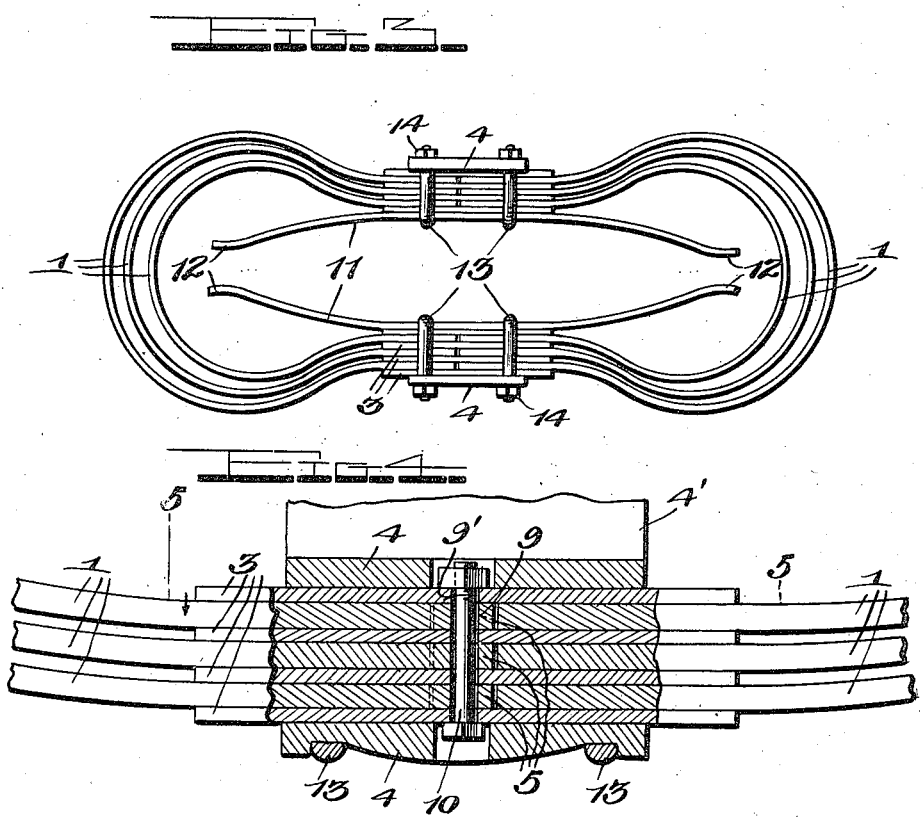
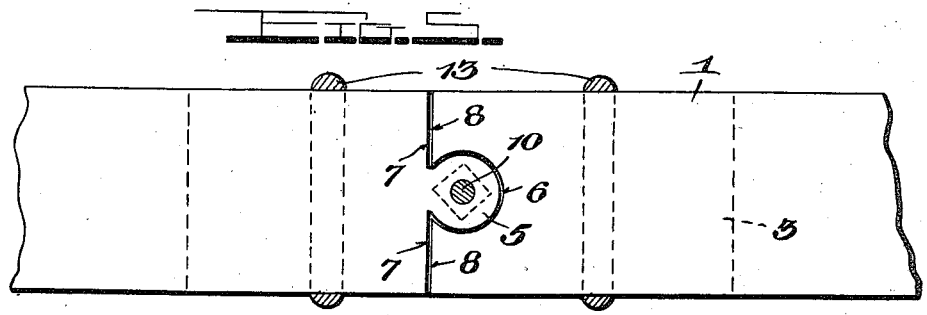

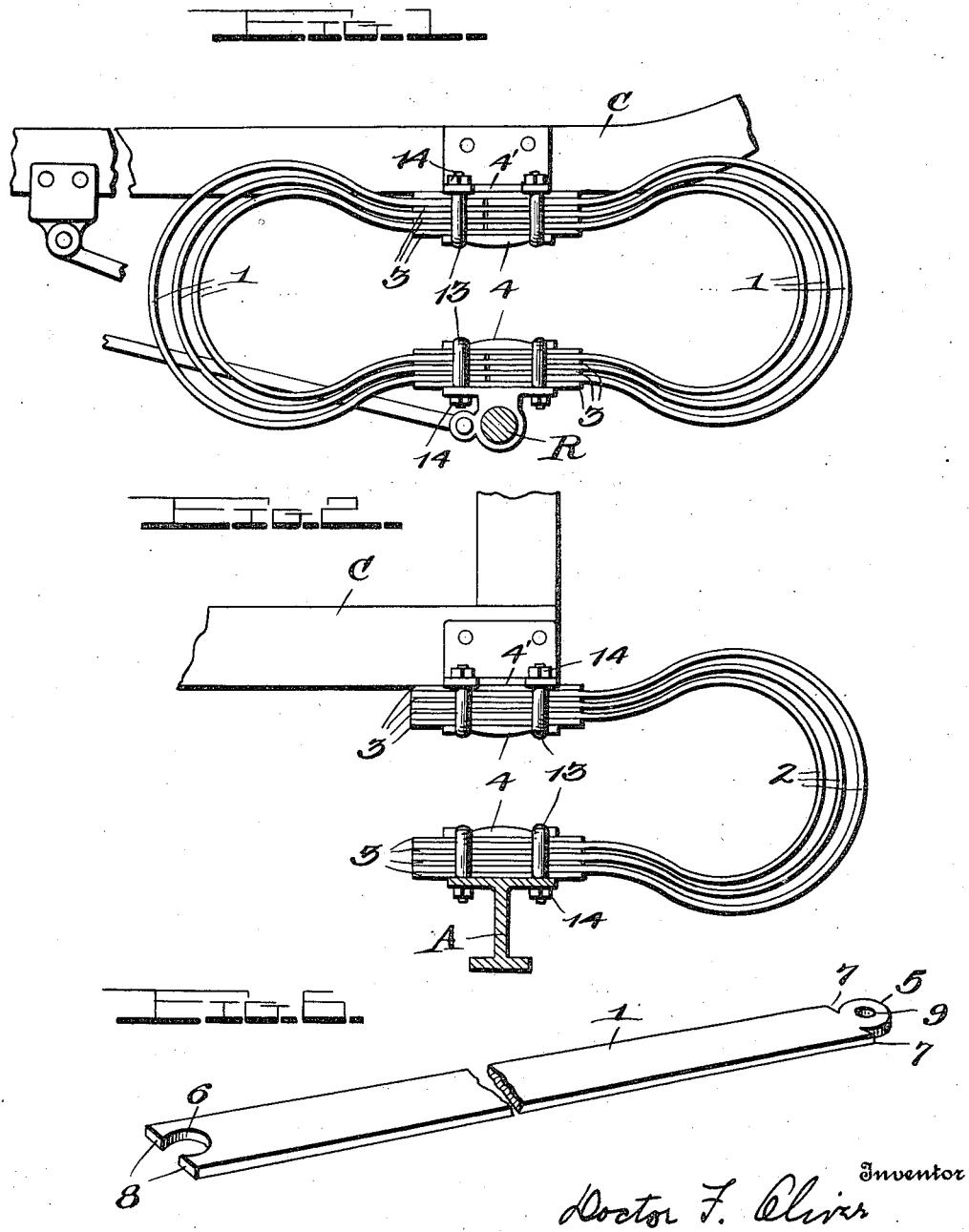

UNITED STATES PATENT OFFICE.

DOCTOR FRANKLIN OLIVER, OF OAKLAND, CALIFORNIA.

VEHICLE-SPRING.

1,173,850.  Specification of Letters Patent.  Patented Feb. 29, 1916.

Application filed March 15, 1915. Serial No. 14,434.

*To all whom it may concern:*

Be it known that I, DOCTOR FRANKLIN OLIVER, a citizen of the United States, residing at Oakland, in the county of Alameda and State of California, have invented new and useful Improvements in Vehicle-Springs, of which the following is a specification.

This invention relates to certain new and useful improvements in vehicle springs and is directed more particularly to springs of the full and semi-elliptical leaf type.

The primary objects of the invention are to provide a vehicle spring which possesses maximum resiliency; which minimizes the shock and jars incident to rebound, and one which substantially eliminates friction in the compression movements of the parts in responding to the weight of the load and other usual rebound movements resultant from or occasioned by the travel of the vehicle.

A further object of the invention is to provide a vehicle spring in which the respective leaves are formed of sections that are interchangeable and are supported in spaced relation to each other so as to not only minimize friction but to also increase the resiliency of the spring by allowing the sections freedom of movement in independence.

A still further object of the invention is to provide a spring structure which lessens the danger of breakage or rupture of the parts.

A still further object of the invention is to provide means for interlocking the sections of the leaves which comprise the full elliptical leaves so as to retain the sections both against relative longitudinal and transverse movements.

In the drawings: Figure 1 is a side elevation of the invention showing a complete or full elliptical spring structure; Fig. 2 is a similar view illustrating a semi-elliptical spring structure, particularly adapted for use with the front axle; Fig. 3 is a view similar to Fig. 1 of the invention equipped with supplemental cushioning means; Fig. 4 is an enlarged fragmentary detail view partly in section showing the manner of connecting the parts; Fig. 5 is a section on the line 5—5 of Fig. 4; Fig. 6 is a perspective view of one of the leaf sections prior to bending thereof; and Fig. 7 is a perspective view of one of the plates which are utilized to separate the leaves.

The invention essentially involves the provision of a pair of completely independent sections 1 which coöperate to constitute a full elliptical spring, Figs. 1, 3 and 4, which sections are of horse-shape or U-formation, and the utilization of but one-half as many sections 2 (Fig. 2) when a semi-elliptical spring is desired. In each form of the invention the sections are maintained in separated relation to each other and to the saddle plates 4 by the use of spacing plates 3.

In the full elliptic form of spring the several sections are provided with preferably rounded heads 5 and sockets 6 at their ends, the head of one section being received in the socket of the opposite section and the shoulders 7 resultant from the rounded formation of the head at the neck thereof, abutting the ends 8 of the opposite section whereby the sections are interlocked both against relative longitudinal and transverse movements. The heads 5 are perforated at 9 and the spacing plates 3 are likewise perforated at 9' and brought to register with perforations 9 whereupon a securing bolt 10 is passed through the registering perforations and the saddle plates 4 to rigidly connect the parts against movement.

In Fig. 3 of the drawings, bowed cushioning springs 11 are employed and are arranged with their concave portions and their free ends 12 in spaced confronting relation, whereby upon compression of the full elliptic spring the free ends 12 of the springs 11 will contact and have a relative wiping or sliding action, thus supplementing the resiliency of the main spring structure. The usual U-tie bolts 13 and nuts 14 are utilized to bind the parts together and to secure same to the brackets 4' of the vehicle chassis C and to the front axle A and rear axle R in Figs. 2 and 1 respectively, and to the cushioning springs 13 in Fig. 3.

It is particularly to be noted that the ends of the spacing plates 3 provide fulcrum points about which the several leaf sections may have independent movement, thus effecting equal distribution of the load and decrease of liability of breaking of the springs.

Obviously in some cases but one pair of sections 1 which coöperate to form a full elliptic spring can be employed, and in cases where a multiplicity of full or semi-elliptic springs are employed, same are of successively increasing size and nested, as depicted in Figs. 1, 2 and 3.

What is claimed is:

1. In a vehicle spring, a pair of completely independent sections each of U-shape arranged to form a full ellipse and having their free ends abutting and interengaged with each other.

2. In a vehicle spring, a pair of completely independent sections each of U-shape arranged to form a full ellipse, and interlocking means formed integral with the adjacent ends of the sections to hold the sections against relative longitudinal movement.

3. In a vehicle spring, a pair of completely independent sections each of U-shape arranged to form a full ellipse, and interlocking means formed integral with the adjacent ends of the sections, and comprising heads having shoulders on their opposite sides and sockets which receive the heads and shoulders on opposite sides of the sockets which abut the first named shoulders.

4. In a vehicle spring, a series of U-shaped leaves of successively increasing size, means to connect adjacent ends of adjacent leaves so as to prevent relative longitudinal movement of the adjacent leaves, and means interposed between the free ends of the leaves to provide fulcrum points about which the leaves may independently move.

5. In a vehicle spring, a full elliptic spring comprising two interchangeable sections the free ends of which abut and are interengaged with each other.

6. In a vehicle spring, a full elliptic spring comprising two interchangeable sections the adjacent ends of which have heads and sockets respectively that receive the heads.

7. An elliptic vehicle spring composed of a series of leaves each having a pair of U-shaped sections the ends of which have perforated heads and sockets that receive the heads, spacing plates having apertures that register with the head perforations, bolts passed through the registering perforations and apertures, and means independent of the bolts to secure the parts to a vehicle.

8. In combination with a lower saddle plate, a spring composed of a series of full elliptic springs each formed so as to be prevented from having relative longitudinal movement between the ends thereof, the lowermost leaf of the spring seating on said saddle plate, plates interposed between the adjacent leaves and overlying the saddle plates so as to form fulcrum points at their ends about which the leaves may move, and means to connect the leaves and plates to the saddle plate, the plates being engaged throughout their lengths by the leaves.

In testimony whereof I have hereunto set my hand in presence of two subscribing witnesses.

DOCTOR FRANKLIN OLIVER.

Witnesses:
ANNETTE MARKHAM,
W. H. NEWBROUGH.